United States Patent [19]
Hazard

[11] Patent Number: 5,365,466
[45] Date of Patent: Nov. 15, 1994

[54] METHOD FOR GENERATING A RANDOM NUMBER IN A SYSTEM WITH PORTABLE ELECTRONIC OBJECTS, AND SYSTEM FOR IMPLEMENTING THE METHOD

[75] Inventor: Michel Hazard, Mareil sur Mauldre, France

[73] Assignee: Bull CP8, Trappes, France

[21] Appl. No.: 194,632

[22] Filed: Feb. 10, 1994

Related U.S. Application Data

[63] Continuation of Ser. No. 741,520, filed as PCT FR90/00924 Dec. 18, 1990, abandoned.

[30] Foreign Application Priority Data

Dec. 19, 1989 [FR] France .................. 89 16769

[51] Int. Cl.⁵ .................. G06F 7/38; H04K 1/00
[52] U.S. Cl. .................. 364/717; 380/23; 380/28
[58] Field of Search .............. 364/717, 717.5; 380/22, 380/23, 24, 25, 28

[56] References Cited

U.S. PATENT DOCUMENTS

| | | | |
|---|---|---|---|
| 4,935,962 | 6/1990 | Austin | 380/25 |
| 4,944,008 | 7/1990 | Piosenka et al. | 380/23 X |
| 4,969,188 | 11/1990 | Schobi | 380/23 |
| 4,974,193 | 11/1990 | Beutelspacher et al. | 364/900 |

FOREIGN PATENT DOCUMENTS

| | | |
|---|---|---|
| 231702 | 8/1987 | European Pat. Off. . |
| 281057 | 9/1988 | European Pat. Off. . |
| 281059 | 4/1990 | European Pat. Off. . |
| 601535 | 1/1988 | France . |

OTHER PUBLICATIONS

Computer Network & ISDN Systems, vol. 14, Nos. 2–5, 1987, pp. 389–395; Ph. Van Heurck: "Trasec: National security system for EFTs in Belgium".

Primary Examiner—Long T. Nguyen
Assistant Examiner—Chuong D. Ngo
Attorney, Agent, or Firm—Kerkam, Stowell, Kondracki & Clarke

[57] ABSTRACT

A method for generating a random number in a system utilizing portable objects, such as cards with electronic memories and data processing circuits, wherein the data processing circuits (TC) of the portable object are operable to generate a random number required for data processing, when the portable object is connected to a processing apparatus of the system. A calculation program recorded in the circuits of the portable object is executed taking into account parameters memorized in the memory (MC) of the object. At least, the following parameters are taken into account each time a random number is requested during a session: a first parameter (PA1) constituted by the datum of a field (RB) of a volatile memory zone of the object, the datum of the field being modified following each request for a random number during one session; a second parameter (PA2) which is modified at least once during each session and is preserved between the end of one session and the next session; and a third parameter which is constituted by a datum specific to the portable object.

6 Claims, 3 Drawing Sheets

| PA2 |
|---|
| 0 0 0 |
| 0 0 1 |
| 0 1 0 |
| 0 1 1 |
| 1 0 0 |
| 1 0 1 |
| 1 1 0 |
| 1 1 1 |

FIG.5A

| PA21 | PA 22 |
|---|---|
| 0 0 0 | 0 0 0 |
| 0 0 0 | 0 0 1 |
| 0 1 0 | 0 0 1 |
| 0 1 0 | 0 1 1 |
| 1 0 0 | 0 1 1 |
| 1 0 0 | 1 0 1 |
| 1 1 0 | 1 0 1 |
| 1 1 0 | 1 1 1 |
| 0 0 0 | 1 1 1 |

METHOD FOR GENERATING A RANDOM NUMBER IN A SYSTEM WITH PORTABLE ELECTRONIC OBJECTS, AND SYSTEM FOR IMPLEMENTING THE METHOD

This is a continuation, of application Ser. No. 07/741,520, filed as PCT FR90/00924 filed Dec. 18, 1990 now abandoned.

The invention described herein is related in subject matter to application Ser. No. 07/741,519 now U.S. Pat. No. 5,177,790 (BULL US 3066) filed concurrently herewith and entitled: "Method For Generating A Random Number In A Data Processing System, And System For Implementing The Method". Said application corresponds to French application 89.16768 filed Dec. 19, 1989 and PCT application PCT/FR 90/00923. The subject matter of U.S. application is hereby incorporated by reference.

The invention relates to a method for generating a random number in a system with portable electronic objects, such as memory and microcircuit cards, and to a system for implementing this method.

The development of applications that employ portable objects, such as memory and microcircuit cards, is essentially due to the fact that these cards have processing circuits that generally include a microprocessor that is capable of performing calculations, not only upon the data entered from outside, but even on the internal data that are inaccessible from outside.

Such cards are distributed to users by authorized organizations, who propose to furnish services by way of equipment or terminals put at the disposal of the public, and to which the user temporarily couples the portable object assigned to him, at the moment when he requests a service to be furnished.

Depending on the nature of the service performed with the aid of a particular portable object, it may be necessary to preserve a certain confidentiality for the data that travel between the portable object and the terminal and consequently the systems using portable objects such as microcircuit cards are arranged in such a way that they are capable of enciphering this data. To this end, encryption programs are recorded both within the processing circuits of the portable objects, and also within the circuits of the associated terminals. These programs also generally use keys to encrypt the data. Consequently, the secret encryption keys are generally recorded in both the portable objects and the associated terminals. These keys are said to be secret when they are accessible only by the processing circuits of the device of the system in which they have been recorded. In turn, the processing circuits of the portable objects and of the terminals must memorize corresponding deciphering programs.

Moreover, numerous functions enabling these transactions to be performed in complete security have been provided, and have been described and protected by a number of patents filed in the name of BULL CP8 assignee of the present invention. Methods have been provided that enable verification whether a decoded datum in fact corresponds to the original datum, and whether any alteration may have occurred during the transmission. Methods have also been provided for reciprocal authentication of the terminal by the portable object to which it is connected and of the portable object by the terminal, so that on the one hand the terminal can be certain that the portable object which is connected to it is in fact intended for the service in question, and so that the portable object can verify whether it is in fact connected to a terminal intended for that service.

In order to be implemented, these different functions often require secret data which are specific to the application in question and must not be capable of being decoded from outside.

The various functions that have just been mentioned are usable when a portable object has been put in circulation by a service provider, and also before the portable objects have been put into service, in what is known as the personalization phase of these portable objects. This consists in introducing into the memory of the portable object the data specific to the application for which the object could be used, some of which data being secret. At the time of the personalization, it is accordingly sometimes necessary to perform encryption operations, and similarly the aforementioned verification functions must be employed.

Moreover, in certain cases, the encryption of data is subordinate not only to taking a secret encryption key into account, but also to taking a random number into account, which makes it possible for a different encoded message to appear when the same datum, taking into account different random numbers among other factors, is encrypted. Thus a defrauder who might observe the datum entered would find it difficult to simulate the outcome of the encryption in advance.

Numerous patent applications, in the name of the assignee of the invention present or third parties, mention systems that employ algorithms for data encryption and deciphering, and show various ways of using random numbers, particularly in systems with microcircuit cards. One such published application if French application 2,601,535.

In such systems, the term random number is generally used to designate the outcome of a calculation performed on predetermined parameters, which may be contained in certain memory zones of the portable objects. As a result, if the parameters used to calculate a random number prove to be identical during the two different calculations, then the outcome of these two calculations is the same.

Thus a skilled defrauder, who each time a random number is drawn, observes the value of the parameters serving as the basis for calculation of that number, and notes which random number is obtained for each combination of parameters, would be capable of determining in advance what the next random number calculated would be, if the parameters serving as the basis for its calculation were to resume a value identical to a value that the defrauder would have been able to observe before. Consequently, the defrauder would be capable of determining in advance the outcome of the encryption of a datum previously encrypted with the same random number.

In order for the system to be as reliable as possible, the probability that the same combination of parameters will be identical during the uses of these systems should be reduced as much as possible, if not reduced to zero, so that the risks of fraud can be limited as much as possible.

In certain modes of use, the random number is calculated by the portable object, by using parameters or data to obtain it that are contained in the memory of the portable object.

For example, in French Patent Application published under No. 2,601,535, and assigned to the assignee of the present invention, it is provided that a random number is obtained from parameters sampled in the control zone of the memory, that is, a zone of the memory where the contents are modified upon each use of the card, for instance in order to memorize fraudulent attempts to use it, or errors, or any other type of control operations required by the particular use for which a particular portable object is provided. More specifically, the word in the control zone that has been modified upon the most recent use is sampled in the control zone of the memory. The random number can result from an encryption of this word of the control zone modified at the time of the most recent use. To economize on memory, the control zone is generally modified bit by bit, and not word by word. As a result, since a memory is normally divided into words of n bits, with each word located at a different address, the contents of a word located at a given address are capable of being modified n times, so that the contents of a word located at a given address of the control memory can be used n times to constitute the random number, its value changing each of these n times, so that upon each change the resultant random number becomes unforeseeable.

However, this solution is not completely satisfactory, since at the end of these n changes, the random number will be obtained by sampling a word located at a different address of the control zone. However, the contents of this word located at a different address are capable of successively assuming the same configurations as the word of the previous address, so that the same random numbers may be retrieved. As a consequence, a defrauder who would have observed the previous series of random numbers would be capable of determining the outcome of later encryptions, in the event that a random number already used would be re-used to encrypt the same datum. This is why in French patent application 2,601,535, the intention has been to use not only the contents of a word of the control zone located at a given address, but also an element taking the value of the address itself into account, so that the random number is obtained from a calculation that takes into account both the value of the word and its address.

This solution proves to be satisfactory in terms of memory consumption, since the random number is calculated from data necessary for the operation of the system.

However, in certain applications the control zone can be modified only a single time during one session, or in other words between the moment when the portable object is connected to the terminal and the moment when it is disconnected, while during the current session, the processing circuits of the system may require the use of a random number multiple times. In such a case, the successive calculations of a random number would procure the same result, since the parameters would not have evolved.

It is accordingly the object of the invention to overcome these disadvantages, by proposing a method that makes it possible, in a microcircuit card system, to obtain numbers that can be classified as random from the standpoint of an external observer, as long as the combination of parameters serving as the basis for their calculation does not occur twice in identical form during the uses of the system. The method according to the invention should also make it possible to obtain random numbers as many times as necessary, either during the same session, or during separate sessions, without substantially affecting the memory consumption.

According to the invention, a method for generating a random number in a system with portable objects such as electronic memory and microcircuit cards, of the generic type, consisting in causing each random number, required when data relating to each card are processed, to be generated by the circuits of each card when the card is connected to the rest of the system by execution of a calculation program recorded in the circuits of the card, is:. characterized in that it comprises taking into account, during one session, at least the following:

a first parameter constituted by a datum of a memory zone of the card, the value of which is modified upon each request for a random number during the session in question;

a second parameter constituted by a datum of a second memory zone of the card, the value of which datum is modified at least once during each session and is preserved between the end of one session and the next session, this second zone moreover being such that the second parameter is not capable of having the same value twice during the service life of the card.

In a preferred embodiment of the invention, the first parameter is constituted by the value of the contents of a field having a precise address in a volatile memory zone of the card, this field serving to memorize the most recent random number calculated during the current session. Given that the field in question is in a volatile memory zone, it loses its contents when the circuits of the card are disconnected from electrical power, so that after the reinitialization of the circuits of the card which ensues when it is reconnected to power, the contents of the field in question resume identity from one session to another.

This is not especially important, since from one session to another the second parameter, which is sampled from a nonvolatile memory zone between two sessions, is modified so that even if the first parameter has an identical value at the beginning of each session, the first random number calculated during a session is still not foreseeable, since it depends on the value of at least two parameters, one of which (the second) cannot twice assume the same value during the service life of the card.

In one embodiment, the second parameter is sampled in a specific memory zone that is not volatile from one session to the next, but the contents of which can be modified by requests of the microprocessor incorporated into the card, for example after the reinitialization of the circuits following the reconnection to power at the beginning of a session. Consequently, this specific memory zone, which contains the second parameter, is for example an electrically eraseable and reprogrammable memory (EEPROM-type memory), and the second parameter is constituted by the contents of a precise field of this zone.

In a preferred embodiment, in order that the second parameter will not twice have the same value during the service life of the card, this value is controlled by incrementing it from one session to another.

Preferably, at least one of the elements taken into account for calculating a random number is secret. Preferably, the secret element is one of the parameters used in the calculation. This precaution makes it possible to prevent a defrauder from having all the elements taken into account to calculate the random number at his disposal, so that he cannot simulate the outcome of a later calculation in advance.

Further characteristics and advantages will become more apparent from the ensuing description, taken in conjunction with the accompanying drawings, in which.

Figure 1:
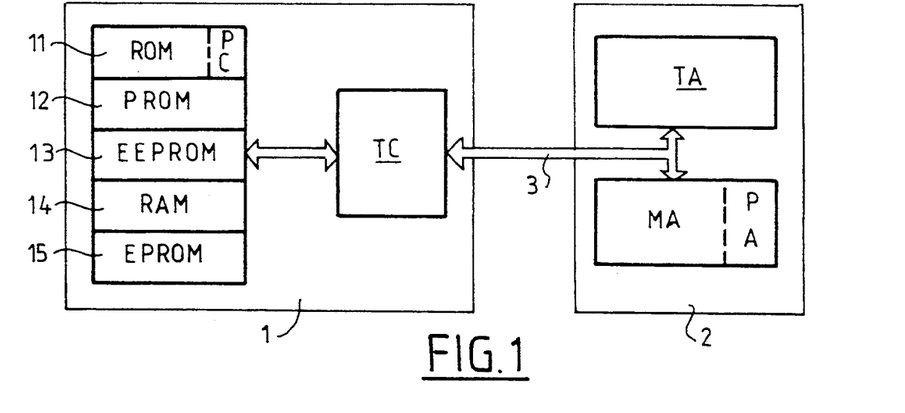
FIG. 1 is a basic diagram of a system for implementing the invention.

In FIG. 1, the minimum elements necessary so that a memory card can function and be used are shown. The present invention can be used to generate a random number regardless of the phase in the life of the card. Hence the invention can be applied to generating a random number during the personalization of the card, that is, during a phase that immediately follows the manufacture of the card, and which consists in introducing data, whether or not secret, that will be necessary for the use of the card in question.

It is equally applicable when the card has been furnished to a final user, from which time it is necessary to generate random numbers when the card is used.

To be used, a memory card (1) must be connected to an apparatus (2), which may be a terminal or an automatic transaction apparatus. The card (1) and the apparatus (2) are connected by way of a transmission link (3). The link may be electrical, and in that case the card is provided with contact zones that are intended to be interconnected with corresponding contact zones of a connector incorporated into the apparatus (2); the link may also be optical, magnetic, or of other kinds, without departing from the scope of the present invention.

One type of transmission link that can be used in such a system is described in French Patent 2,483,713 assigned to the assignee of the invention, entitled "Dispositif pour la transmission de signaux entre deux stations de traitement de l'information" [Apparatus for Transmitting Signals Between Two Information Processing Stations] (this French Patent corresponds to U.S. Pat. No. 4,556,958).

The card (1) contains at least one memory (MC) and data processing circuits (TC), enabling processing of the data contained in the memory (MC) of the card, or of data originating from outside, for example data originating directly in the apparatus (2), or relayed by it in the event that the system includes a plurality of interconnected apparatuses forming a network.

In a manner known per se, the memory (MC) of the card can be partitioned into a plurality of different memory zones, which are distinguished from one another by their electronic nature. Each zone also has a certain number of memory words that can each be located by their address in the zone.

Hence the memory (MC) of the card (1) may contain a first ROM memory zone (11), that is, a nonvolatile memory zone, which in particular contains the data containing the instructions of a program (PC) that can be executed by the processing circuits (TC) of the card. This first nonvolatile memory zone (11) is programmed once and is not reprogrammable.

The memory (MC) may also include a second nonvolatile memory zone (12), but it is programmable during the service life of the card, for example under the control of the processing circuits (TC) of the card, under the conditions of access that are managed by the program (PC). This second zone (12) is of the PROM type. It is in that zone that the information or data for personalizing each card are written, such as the serial number, secret codes enabling access to the system, after control of a corresponding code entered on a keyboard of an automatic transaction apparatus, such as the apparatus (2), and in general any type of data whether or not secret, that would appear in the course of use of the card and that it would be necessary to preserve during the entire remaining service life thereof. For example, in certain applications, the card is furnished to its final user with a secret code predetermined by the service provider who furnishes the user with this card. In certain cases, the user is authorized to modify his secret code, in order to introduce one that he has deliberately composed. A modified code of this kind is memorized in the second zone (12) of the PROM type. It is also in that zone that a state memory may be constituted, which serves to memorize the attempts of access or the number of operations performed with the card (1) since its first use, for example. As mentioned above, this second memory zone (12) may contain the information that must remain secret from the outside, such as the access codes, which means that only the processing circuits (TC) of the card will be able to use this information, while other portions of this second zone are accessible for reading and/or writing, either one, by either the processing circuits (TC) or the processing circuits (TA) of the apparatus (2). This structure is well-known in the prior art, and in particular has been employed for many years in the products of the present applicant.

A card for implementing the method of the present invention includes a third memory zone (13) of the EEPROM type, that is, a memory that is nonvolatile when the electrical supply to the card is not assured, but which may, however, be modified by the request of the processing circuits or by external requests, either word by word or in part, or even in its entirely. Such a memory zone is currently known as an electrically eraseable and reprogrammable memory zone.

In a preferred embodiment, the present invention exploits the presence of this third zone particularly advantageously, to obtain random numbers without excessive memory consumption.

It should be noted that the use of memory zones of the EEPROM type has already been envisaged for some time in memory cards, to increase the useful life of these cards. In fact., although increasingly powerful possibilities for integration of components have been achieved, this does not avert the fact theft the memory capacity of portable objects, such as microcircuit cards, is limited. A memory card is an information carrier that contains information that must remain permanent, such as the information enabling identification of the bearer of the card, and/or information that may be useful only temporarily. Thus in banking or monetary applications, information such as the balance of an account is information that evolves. In the first types of memory cards, it was intended that such information be written in the PROM-type memory zone, that is, the memory zone that was writable but was not thereafter volatile. As a result, when a new balance had to be written, the preceding balance was preserved, which uselessly consumed memory. For the same type of use, that is, banking or monetary use, the use of a EEPROM-type memory makes it possible for this type of information, which is not useful during the entire service life of the card yet must still be preserved temporarily, to be memorized.

All these types of applications involve some information or data that need not be preserved forever, and a EEPROM type of memory is particularly well-suited for that situation.

The management of this memory zone, in particular the determination of the moment when all or some of the fields it contains should be erased to enable their re-use, is not the subject of the present invention, but more particularly depends on the type of application for which the portable object is intended. Nevertheless, it will be explained hereinafter in greater detail how the invention profits from the presence of this EEPROM-type memory zone 13.

The memory MC of the card may also contain a fourth volatile RAM-type memory zone 14, that is, a memory zone in which the data or information it contains are lost as soon as the electrical supply to the card is no longer assured. This zone can be used to memorize information or data of which it is known in advance that they will not be necessary from one session to the next. This fourth memory zone 14 is also used at the moment of erasure of the third, EEPROM-type zone, for temporary storage of certain data from this third zone that will have to be rewritten after that zone has been erased.

Thus in banking applications, the balance of a client account that is to be written in the third EEPROM zone would have to be transferred to this fourth memory zone (14) (of the RAM type) before the EEPROM-type zone is erased, and then it would have to be transferred back to the third zone (13) from the fourth zone (14).

The present invention also benefits from the presence of this fourth memory zone (14) in calculating the random numbers.

Finally, the memory zone (MC) of the portable objects (1) may include a fifth memory zone (15) of the EPROM type, that is, a zone that is nonvolatile when the electrical supply to the portable object is cut, but which nevertheless may be erased in totality, for example by subjecting it to exposure to ultraviolet radiation.

An apparatus (2) for the exchange of data or information with a card (1) and for the complete or partial processing of this information has a structure known per se. Reference may be made to numerous patents in this field and in particular to French Patent Application No. 2,601,535, to name only one. Such an apparatus (2), which may be a transaction terminal, or an element of a personalization machine, includes in particular data processing circuits (TA) that can execute appropriate programs, the instructions (PA) of which are recorded in a memory (MA) incorporated in or associated with this apparatus. The memory (MA) of the apparatus may be much larger in size than the memory (MC) of the card (1), and may be constructed on the basis of electronic elements and/or peripheral memories, such as diskettes, or other data carriers known in the art. The memory (MA) of the apparatus may contain a nonvolatile zone, with secret data that are used both in the various transactions and in the process of verifying the validity of the cards connected to it. Such processes are known as authentication processes.

The secret data and the program (or at least some of it) of the apparatus may be incorporated in an integrated security module, more commonly known in the art by the abbreviation MCS.

Figure 2:
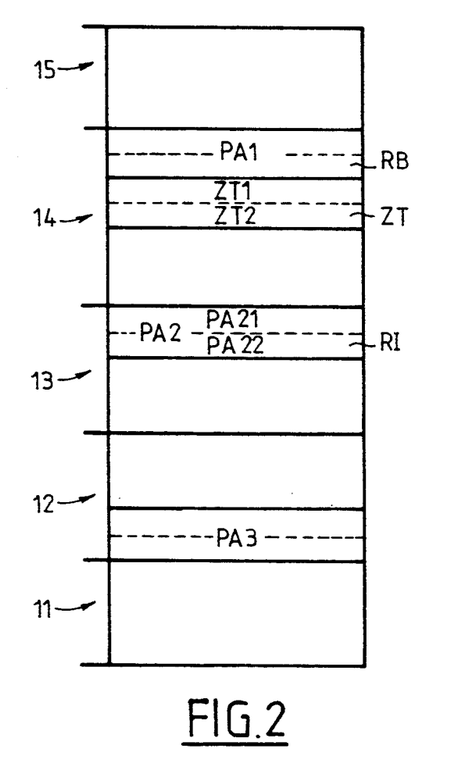
FIG. 2 shows a variant for organization of the memory of a portable object for implementing the invention.

FIG. 2 shows a variant of organization of the memory of the object making it possible to obtain a random number in such a system implementing the present invention.

A random number is obtained by applying a calculation algorithm to at least two parameters, the first (PA1) of which is constituted by a datum of a memory field (RB) of the card or portable object, the contents of which are modified upon each request for a random number during a session, and the second (PA2) of which is constituted by a datum of another memory field (RI), the contents of which are modified at least once during each session. In addition, the second parameter is selected such that it is not capable of having the same value twice during the service life of the portable object or microcircuit memory card.

In a preferred embodiment, the first parameter (PA1) is constituted by the value of the most recent random number calculated during the current session. To enable use, for later calculation, of the most recent random number calculated during the current session, it is necessary to provide a memory field (RB) in which this last number is memorized in the memory of the portable object or card. As in every information processing system, each of the memory zones can be divided up into a plurality of fields or words, which can be located by their address. In accordance with the present invention, to enable memorization of the most recent random number calculated during a session, the field (RB) for memorizing the most recent random number calculated during the current session is provided in the fourth RAM memory zone (14), that is, the zone the contents of which are destroyed each time the portable object is disconnected. At the time a random number is calculated, this field (RB) is filled with this random number, which constitutes the first parameter (PA1) at the time of a later calculation. Upon a later calculation, the new random number calculated is substituted for the random number that was calculated and memorized previously. The address or the position in memory where the random number is to be memorized may be set once and for all, or may be determined in the course of a session by the processing circuits of the portable object. This aspect is not of primary importance; the only important aspect is that the processing system be capable of determining the location in memory (14) of the most recent random number calculated.

Each time the circuits of the portable object or card are connected to voltage, the first parameter is capable of resuming an identical value, since it is memorized in the memory zone the contents of which are erased each time the circuits are disconnected from power, and this zone is reinitialized upon each reconnection to power. This has no importance, since this calculation program for a random number takes not only this first parameter into account but also a second parameter, the value of which is not capable of twice resuming the identical value during the service life of the card.

This mode of implementation is particularly economical in terms of memory, since it is sufficient to provide merely a single memory field in the volatile (RAM) memory zone (13), the field containing a number of bits corresponding to the format of the random number that one wishes to calculate, and since it suffices, upon each calculation of a random number, to replace the value that this field contained at the end of the preceding calculation or at the reconnection to power at the circuits, with the new calculated number.

Thus by way of example, the various memory zones of a memory and electronic microcircuit card, having the size and shape of credit cards, include 32-bit words. In a preferred embodiment of implementing the invention, the calculation of the random numbers is performed on 64 bits, so that it suffices to reserve two 32-bit words in the fourth volatile (RAM) memory zone (14) of the memory of the card or portable object, to constitute the memory field (RB) for memorizing random words calculated successively during a session.

FIG. 2 illustrates what has just been described. A memory of a portable object for implementing the invention has been shown here in further detail. The fourth volatile memory zone (14), with a plurality of fields, is shown. A dashed line appears in the field (RB), to show that the field (RB) could constitute one or more words, which is the case when the random number is calculated with 64 bits while the memory contains 32-bit words.

FIG. 2 also shows which other portions of the memory are capable of being used for calculation and generation of a random number. In particular, in the fourth memory zone (14), or in other words the volatile zone, a field (ZT) is shown, constituted on the basis of a plurality of memory words (ZT1, ZT2) and used during the phase of modification of the second parameter from one session to the next, as will be explained hereinafter.

The third memory zone (13) includes a field (RI), which can also be constituted of a plurality of words (PA21, PA22). It is the complete contents of this field that constitute the second parameter (PA2) used for calculating a random number.

The program for calculating a random number is preferably written in a nonvolatile portion of the memory. It may be written in the first memory zone (11), of the read-only type (ROM), at the time of masking thereof, or it may be written after the card or portable object is put into service, inside the second zone (12) of the PROM type.

This calculation program employs a more or less complex function (F). To calculate the random number, the processing circuits of the portable object read and sample the contents (PA1) of the field (RB) of the fourth memory zone; they read the second parameter (PA2) contained in the field (RI) of the third zone (13), and the function (F) for calculating the random number is applied, such that a random number (RN) is a function of two parameters:

RN=F (value of PA1, value of PA2).

Next, after a random number has been calculated, the operating program of the card or portable object is such that the processing circuits (TC) of the card or portable object write, i.e., inscribe the outcome of this calculation in a field (RB), so that it can serve for a later possible calculation of a random number during the current session.

It is understood that the first time a random number is calculated in a session, the contents in the field (RB) are not a function of the outcome of a preceding calculation, since the field (RB) is located in a volatile memory zone. As has already been mentioned, this has no importance, since the contents of the field (RB) constitute only one of the parameters taken into account to calculate a random number, the other parameter (PA2) being constituted by the contents of a field (RI) of the third memory zone (13). The contents (PA2) of this field (RI) are modified once during each session, so that from one session to the next, they do not resume the same value.

The contents of the field (RI) of the third zone (13), constituting the second parameter (PA2) taken into account in calculation of a random number, are preferably modified at the beginning of each session, before a random number has been calculated. The modification of the contents (PA2) of this field (RI) for example immediately follows the reinitialization of the circuits of the card or the portable object, after it has been connected to power. This systematic modification, after the reinitialization, or at least before a first calculation of a random number, makes it possible to avoid fraud problems. In fact, if this precaution were not taken, a defrauder could very easily disconnect this card before the contents (PA2) of the field (RI) had been changed in the course of a session, so that at the beginning of the next session, the second parameter would have the same value. Now since *a priori*, at the beginning of each session, the first parameter contained in the field (RB) resumes the identical value after the reinitialization of the circuits, the result would be the observation of the calculations that would have taken place during the preceding session, making it possible to predetermine the results of the next session. This precaution is therefore particularly useful.

In one mode of implementation, the modification of the second parameter (PA2), contained in the field (RI) of the third memory zone (13), is effected by incrementing the value of this parameter, with the aid of the processing circuits of the card of the portable object. Since this parameter is contained in an electrically eraseable, reprogrammable zone, the operating program of the processing circuits of the portable object or microcircuit memory card is such that only the contents (PA2) of this field (RI), or of a portion thereof, can be modified from one session to the next, without any need for intervention in the other fields of this zone (13). This poses no difficulty, because it is entirely possible, with EEPROM-type memories, to modify only the contents of predetermined fields of these memories without modifying the rest of these memories.

In a preferred embodiment, the function used to calculate a random number employs an encryption algorithm, such as the known algorithm currently known by its initials (DES), from its English name, "data encryption system", or it may employ only some of the functions that this algorithm usually includes.

Preferably, the generation of a random number additionally takes into account at least one third parameter (PA3), which makes it possible to diversify the results of calculation from one portable object or card to another. In effect, assuming that a defrauder wishes to cheat the system and has two identical cards, and given that the programs employed are the same, then if the first parameter of a first card were identical to the first parameter of a second card, and if simultaneously the second parameter of the first card were identical to the second parameter of the second, then the results of calculation of the random numbers applied to these two cards would be identical. A defrauder could profit from this aspect to attempt to cheat the system by transposing the observations made with a first card to a second. For this reason, in the preferred embodiment, the third parameter (PA3) is for example a parameter that is unique to each of the cards, and is written after manufacture in a nonvolatile memory zone for the entire service life of the card. This parameter (PA3), which is shown in FIG. 2 in a memory field of the second, nonvolatile zone (12) of the card, may also implanted in a EEPROM-type memory zone, that is, a zone corresponding to the third zone (13) in FIGS. 1 or 2, on the condition that the operating program of the card is such that if this third parameter is implanted in the EEPROM memory zone, it cannot ever be erased, for the entire service life of the card.

Hence as the third parameter (PA3), it is possible to imagine using the serial number of the card, or any other key or datum specific to each of the cards, if such are provided. It has in fact been noted above that random numbers may be required in any phase of the service life of the card, that is, during the manufacturing phase, the pre-personalization phase, the personalization phase, or even once the card has been turned over to its final user.

During the phases of manufacture or pre-personalization, cards are encountered in which there are not yet any data that are distinctive between the various cards of the same batch, so that it is impossible, or difficult, to obtain different random numbers between two cards of the same batch. This is not very important, since at the end of these phases, which proceed under the direct control of the manufacturer, or in other words under conditions of maximum security, a time very rapidly arrives when the different cards of the same batch contain at least one datum that is distinctive from one card to another.

During the manufacture of the components, a manufacturer's key, that is, a datum specific to the manufacturer of a batch of cards, is inscribed. Each random number required during the manufacturing and pre-personalization phases, after this manufacturer's key has been inscribed, will be obtained by using this manufacturer's key as a third parameter (PA3). At the end of these phases of manufacture and pre-personalization, and during the phases of personalization and use, either a personalization key or the serial number, or a combination of these different specific keys or data, will be used to constitute the third parameter (PA3).

In FIG. 2, the fifth zone (15) of the EPROM-type contains no parameters whatever serving to calculate random numbers. However, it is possible that the third parameter (PA3), or all or some of the personalization data, may be inscribed or written in this fifth EPROM-type zone (15) instead of being written in the second PROM-type zone (12). This may be the case, for example, if provision is made so that the service provider can "refresh" the portable object in the course of its service life, by modifying the personalization data inscribed on it.

Figure 3:
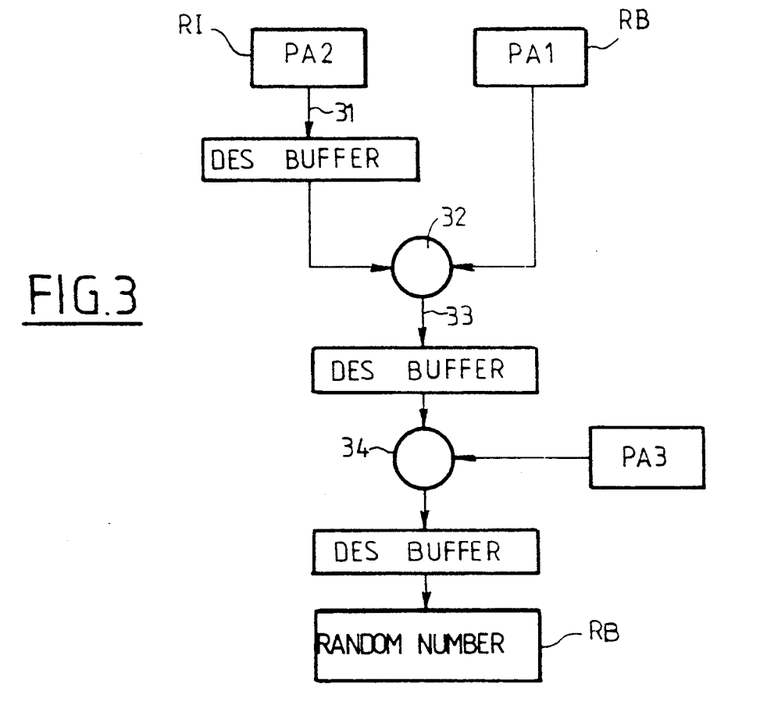
FIG. 3 illustrates the principle of calculation of a random number.
Figure 4:
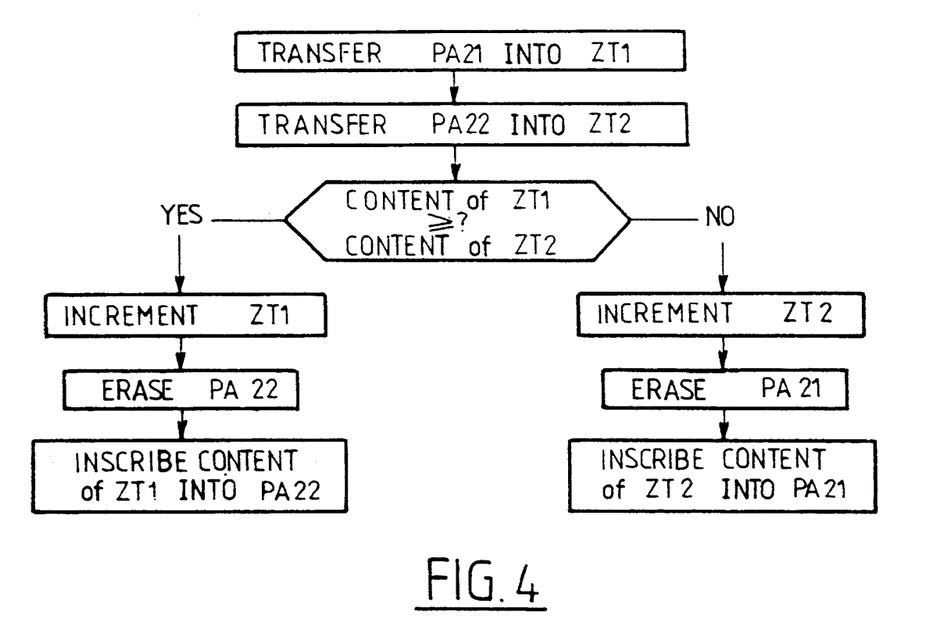
FIG. 4 and 5A and 5B illustrate a way in which the second parameter can be modified.

Finally, in a variant not shown, the third parameter (PA3), or in a more general fashion all or some of the personalizing data, are inscribed in the third, EEPROM-type zone (13). FIG. 3 shows a basic diagram for calculating a random number, and FIG. 4 illustrates a procedure of incrementing the second parameter (PA2), in the case where each of the memory zones is composed of 32-bit words, and where 64 bits, i.e., two words, are used at least to calculate the random number, and in the case where this second parameter (PA2) is memorized in a EEPROM-type memory zone.

Preferably, the implementation of an algorithm such as DES is done by memorizing the data on which the calculation is to bear, in a buffer memory specific to DES. This is what is shown in FIG. 3, where this specific buffer memory is shown, identified by the name DES BUFFER. In a first phase (31), the contents of the field (RI) containing the second parameter (PA2), in the third, EEPROM-type zone (13), is loaded into a buffer memory of the DES (DES BUFFER). Next, the contents of this memory or buffer register and the contents of the field (RB) comprising the first parameter are combined with one another (phase 32), in such a way as to obtain a 64-bit word, in the example in question, which is then memorized in the DES buffer register (phase The operation performed between the contents of the field (RB) and the contents of the buffer register (DES) during phase (32), is a logic operation such as an EXCLUSIVE OR, AND so forth, which makes it possible to combine the contents of the buffer register of DES with the contents of the field (RB). The operation may also be one that is more complex, but the result of which is an intermediate parameter, that is compatible in size with the size of memory of the DES buffer register (DES BUFFER).

This FIG. 3 illustrates the case where generation of a random number takes into account not only the first two parameters but also a third parameter (PA3), such as a specific key, like that mentioned above. Thus in a phase (34), the algorithm (DES), or all or some of it, or any other algorithm making it possible to perform an encryption, is applied to the new contents of the register of DES, originating from the results of the operation performed during phase (32), and to the specific key mentioned, which in turn is sampled in the memory zone where it is memorized. The result of the operation performed during this phase (32) is then written in the DES register (DES BUFFER), before being written in the field (RB) of the fourth, volatile memory zone of the card or portable object. Thus a new random number is immediately memorized in the appropriate field, with a view to a possible later calculation.

In order for the concept of the random number to be complete, and for any risk of fraud to be excluded, in a preferred embodiment complementary precautions are provided, which apply to all the variants in distribution of the various parameters among the various zones.

In fact, everything that has been described above shows that the invention makes it possible to prevent the same combination of parameters from recurring during the service life of the card, so that simple observation or knowledge of the parameters does not make it possible immediately to deduce the random number that will then be obtained. However, the knowledge of these parameters and of the calculation algorithm would permit a skilled defrauder, with suitable equipment at his disposal, to calculate the future random number in advance.

This could be the case if an algorithm such as DES or some of it is used, since this algorithm is divulged to the public.

For this reason, in a preferred embodiment, at least one of the elements taken into account in the calculation of random numbers is secret, thus preventing skilled defrauders from being capable of predicting the results of later calculations in advance.

Preferably, the secret element is one of the parameters used in the calculation. Since the first parameter (PA1) sampled in the field (RB) of the fourth memory zone is the random number calculated before that, this first parameter cannot be secret, since it is intended to be transmitted from the card to the apparatus (2) to which the card is connected. Hence it remains an option to make the second parameter (PS2) secret, and/or the third parameter (PA3), if it is taken into account in the calculation.

Known methods exist, which the present applicant moreover uses in a number of its products, to make the information contained in predetermined memory zones secret. One of the best-known methods consists in associating a lock bit with the words that one wishes to protect from reading by external circuits, the lock bit being set in a predetermined state indicating to the processing circuits (TC) of the portable object (1) whether the information in question must remain secret or not with respect to the external circuits.

In the particular case of the present invention, it is thus possible to make the second parameter (PA2), or the third parameter (PA3) as well, read- and write-accessible solely by the processing circuit (CC) of the portable object, by assigning to these parameters at least one bit that indicates to the processing circuits that the value of the parameter must not be transmitted to the outside. Preferably, this bit is set at a suitable value at the conclusion of manufacture of the portable object. In a variant, it is the management program of the portable object memorized in ROM or PROM that manages access to the memory zones.

It is understood that it is equally necessary for the parameters (PA2) and (PA3), like the parameter (PA1), to be incapable of being modified upon request from outside. In fact, a defrauder, if he knew the algorithm and succeeded in assigning the value he desired to the parameters, could cheat the system. For this reason, all the parameters used to calculate the random number are write-protected against being inscribed from outside, and their contents cannot be modified except under the control of the processing circuits (TC) of the portable object. This protection can also be assured by lock bits, or by the management program of the object itself.

As has been mentioned above, the second parameter (PA2) contained in the field (RI) of the third memory zone (13) is modified by incrementation in each session. In one preferred embodiment of the invention, provision is made that during the personalization of the memories of the portable objects, the second parameter (PA2) is not initialized to the same value in each of the portable objects. This precaution proves useful for applications in which only a first (PA1) and second (PA2) parameter are taken into account. In that case, if the second parameter were identical in each of the cards or portable objects after manufacture, then a defrauder who obtained several cards for himself could cheat the system, on the basis of observations made with a first card, by using the other cards that he would have at his disposal.

In one embodiment, this initialization to different values of the second parameter (PA2) is performed during the personalization of the portable object (1). The value of the second parameter is calculated or extracted from the processing circuits (TA) of the personalizing apparatus, and then is written within the field (RI) of the third zone (13), while this field is as yet not write-protected with respect to the outside. During this personalizing phase, once the initial value of the second parameter (PA2) has been written, then the bit for write-protection with respect to external circuits is properly set.

The determination of the initial value of the second parameter (PA2) that is to be written in each of the cards may be done by a calculation performed by either the processing circuits (TC) of the card, when it is connected to the personalizing machine, or in the processing circuits (TA) of the personalizing machine. When the calculation is performed by the processing circuits (TC) of the portable object (1), the value of the serial number of the object can be taken into account, since it differs from one object to the other, so that the initial value of the second parameter (PA2) has a strong chance of differing from one portable object to the other.

When the calculation is performed by the processing circuits (TA) of the personalizing apparatus, the value of the second parameter to be written in the memory of the portable object can be obtained following a calculation that takes into account a random number generated at the level of the personalizing apparatus, or it may be a value of a register in the memory (MA) of the personalizing apparatus, incremented each time a new portable object is introduced.

Other solutions can be imagined to initialize the second parameter upon completion of manufacture of the portable object, the essential factor being that a defrauder, in the event that he has several portable objects at his disposal, knows that they do not necessarily have the same initializing values, and that as a consequence he cannot simulate in advance the results that he would obtain with each of the objects in his possession. When a third parameter (PA3) is used to calculate a random number, as has been provided above, then it is necessary for this parameter (PA3) to be secret when the parameter (PA2) is not secret, and that the maximum degree of security be offered. It is understood that when the second parameter (PA2) is secret, it is unnecessary for the third parameter (PA3) to be secret. Contrarily, when the third parameter (PA3) is secret, then the second parameter (PA2) need not necessarily be secret.

As has already been mentioned, the third parameter (PA3) may be the serial number of the portable object, or a specific key written at the time the portable object is personalized. In general, this serial number should remain accessible for reading by any arbitrary processing circuit (TA) of an external apparatus (2) for processing data contained in the memory of the portable object. In that case, when the third parameter used is the serial number, then the second parameter (PA2) must be inaccessible for reading by the processing circuits (TA) of an external apparatus (2). Contrarily, any other diversified, secret datum specific to a predetermined portable object may constitute the third parameter (PA3), without the necessity to provide a specific one for calculating the random numbers. FIG. 4 illustrates a method of incrementing the second parameter, when this second parameter constitutes two memory words, for example two 32-bit words, so that the second parameter includes 64 bits. More precisely, FIG. 4 shows a flow chart of the operations that can be implemented to perform this incrementation.

FIG. 4 may be understood by turning also to FIG. 2, the elements of which that have not been described above will now be described.

As can be seen in FIG. 2, in such a case, the field (RI) of the third zone (13) containing the second parameter (PA2) is made up of two sub-fields (PA21 and PA22), each constituted by one memory word.

In addition, in the volatile memory (14), a buffer field (ZT) has been provided, also including two sub-fields (ZT1 and ZT2), which are used during this incrementation phase, which it will be recalled take place after each reinitialization of the circuits of the card or portable object, after it is reconnected to power, or in other words after the establishment of communication between the portable object or card (1) and the appropriate transaction apparatus (2).

A first phase consists in loading the contents of the first sub-field (PA21) from the third zone (13) to the first sub-field (ZT1) of the fourth zone (14). The contents of the second sub-field (PA22) of the third zone (13) are then loaded into the second sub-field (ZT2) of the fourth zone (14).

As a result, after these loading operations, the buffer field (ZT) of the fourth zone (14) has the same contents (PA2) as the field (RI) in the third zone (13); that is, it contains the second parameter.

Following these loading operations, a test is performed between the contents of the sub-fields (ZT1 and ZT2) of the forth zone (14), in order to verify whether the value of the contents of the first sub-field (ZT1) is greater than or equal to the value of the contents of the second (ZT2).

If the answer is in the affirmative, the value of the first sub-field (ZT1) of the fourth zone is incremented, and the second sub-field (PA22) of the third zone (13), that is, the one the contents of which have been loaded in the second sub-field (ZT2) of the fourth zone (14), is erased, and the new value of the first sub-field (ZT1) of the fourth zone (14) is written in the second sub-field (PA22) of the third zone (13), so that the new second parameter is constituted as follows: contents of first sub-field (PA21) identical to those of the preceding session, and contents of second sub-field (PA22) corresponding to contents of first sub-field (PA21) incremented with respect to the preceding session.

When the aforementioned test reveals that it is in fact the contents of the second sub-field (ZT2) that are greater than those of the first sub-field (ZT1), which means that in fact the contents of the second sub-field (PA22) are greater than those of the first sub-field (PA21), while the contents of the second sub-field (ZT2) of the fourth, volatile zone (14) are incremented, then the contents of the first sub-field (PA21) of the third zone (13) are erased and replaced with the contents of the second sub-field (ZT2), obtained after incrementation.

It is understood that the procedure that has just been described is not limiting, and that any other procedure could be chosen instead. In particular, if one wished to make do with random numbers the length of which corresponds to the length of words in the memory, then it would have sufficed for the second parameter (PA2) to constitute only a single word, and the incrementation procedure would have been much simpler, since it would be done in the same way as is done in a counter.

The procedure that has just been described is accordingly more particularly suitable when it is desired that the random number have a sufficient size to be sufficiently significant.

With the procedure that has just been described, it is clear that when the second parameter (PA2) constitutes two memory words, the evolution of this parameter (PA2) in successive incrementations from one session to the next is such that each of the words constituting this parameter is modified once for both, and that the modification of one word consists in replacing this word with the other word after it has been incremented.

Figure 5A:
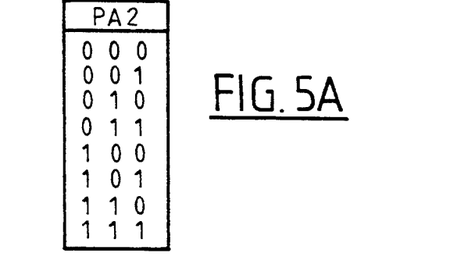
Figure 5B:
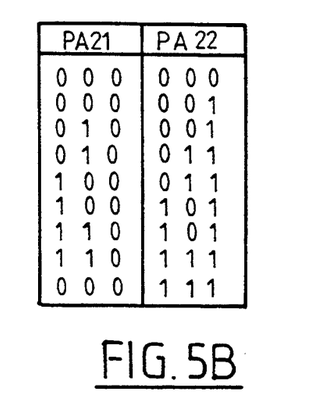

However, the fact that the second parameter constitutes two words each having a number N of predetermined bits does not significantly increase the number of possible combinations so as to be able to constitute this second parameter. As has already been mentioned above, this constitution with the aid of two or more words simply makes it possible to adapt the format of the parameter (PA2) to the format of the random number desired. In fact, since each constituent word of the second parameter is modified once for both, it is clear that the total number NT of different second parameters (PA2) that it is possible to obtain can be calculated as follows: $NT = 2^N + 1$. If the parameter (PA2) had been constituted by only a single word of N bits, then the total number NT' would have been: $NT = 2^N$. This is illustrated by FIGS. 5A and 5B, which show how the second parameter (PA2) evolves when it is composed of one word having three bits (FIG. 5A), or two words of three bits each (FIG. 5B), incremented as described in conjunction with FIG. 4. In FIG. 5A, it is clear that there are only eight possibilities for the second parameter (PA2), when this parameter is constituted of only one three-bit word, while in FIG. 5B, it can be seen that nine possibilities exist.

In one embodiment, the second parameter (PA2) is constituted of two 32-bit words, and it can then be determined that it can assume approximately 4.3 billion different values. This is largely sufficient, since if one assumed that the card were connected permanently to a terminal, and that a random number would be calculated every second, a permanent connection would have to last 136 years to exhaust all the possibilities, also assuming that the initial value of the second parameter (PA2) is 0 (digital 0) and that each incrementation bears on one unit. In fact, in numerous practical applications, the service life or use is intentionally limited to a few years.

When the present invention is applied to a portable object or card having a EEPROM-type memory zone, then it is possible to generate random numbers is a particularly economical manner in terms of memory, as has just been illustrated.

However, all applications that employ cards or portable objects do not have a EEPROM-type of memory zone. Nevertheless, the invention is also applicable to systems that use cards or portable objects not having this kind of EEPROM-type memory zone, as illustrated by FIGS. 6A to 7B.

Figure 6A:
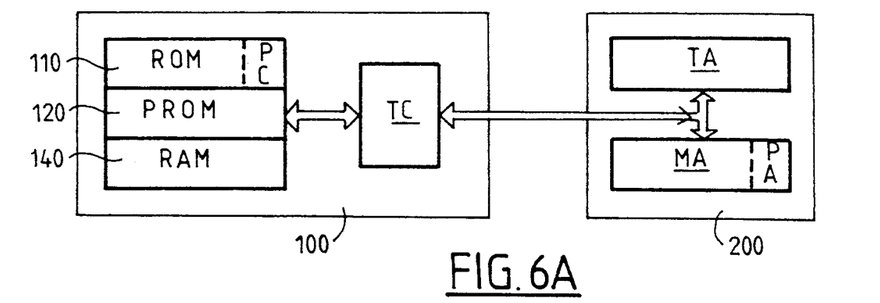
FIGS. 6A–6B and 7A–7B illustrate two variants of organization of the memory of a portable object.
Figure 6B:
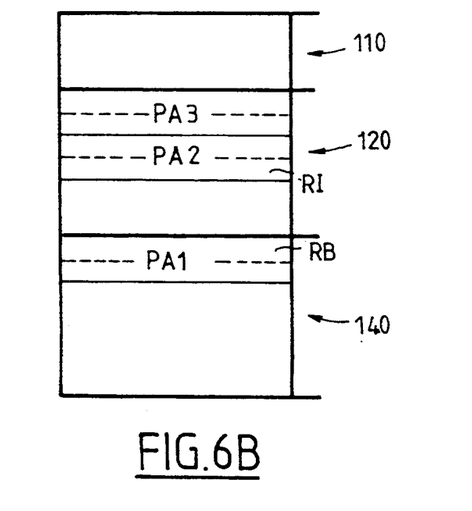

FIG. 6A illustrates a first variant of a system that does not include a EEPROM-type memory, and FIG. 6B more particularly illustrates how the parameters (PA1, PA2, PA3) are memorized in the memory.

A system as illustrated in FIG. 6A includes a portable object (100), such as a card, with a memory (MC) and circuits (TC) for processing data of the memory. The system also includes at least one transaction apparatus or machine (200), which is identical to or similar to that shown in FIG. 1, and which thus includes processing circuits (TA) and a memory (MA), part of which is used to memorize an operating program (PA).

The memory (MC) of the portable object (100) includes a first memory zone (110) of the ROM type, in which the operating program (PC) of the portable object can be written. Such a memory would also include a second PROM-type zone (120), that is, a programmable, nonvolatile zone, and finally a third zone (140) of the RAM type.

FIG. 6B shows how the parameters are managed and distributed among the various zones of the memory (MC) of the portable object.

The first parameter (PA1) is memorized in a field (RB) of the RAM-type zone (140). Preferably, as was the case with the variant shown in the preceding FIGS.

1-5, the first parameter (PA1) is the most recent random number calculated during the current session. This first parameter (PA1) can also occupy a plurality of memory words, which is represented by a dashed line crossing the field (RB) in FIG. 6B.

As in the variants shown in conjunction with FIGS. 1-5, the third parameter (PA3), which may also occupy more than one memory word, is memorized in a field of the PROM-type memory zone (120). This third parameter may be the serial number of the portable object, or a secret diversified datum specific to that object.

The difference between the variant illustrated by FIGS. 6A and 6B and the variants illustrated by the preceding figures resides in the fact that because of the absence of a EEPROM-type memory zone, the second parameter, modified during each session, must be memorized and managed differently. In this case, the second parameter (PA2) is constituted by a datum of the PROM-type memory zone (120); that is, it likewise contains the third parameter. As has been indicated with respect to FIGS. 1 and 2, the PROM-type memory zone is the one at least some of which is used as a control memory; that is, it serves to memorize the events occurring in the course of the service life of the portable object. In fact, the control memory is constituted by a certain number of words of the zone, and it is modified under the control of the processing circuits (TC) of the portable object. As has been explained in the introductory section to the present application, a word of the control memory can be modified as many times as it includes bits, as long as each modification bears upon one bit. In other words, if each word of the control memory includes eight bits, then theoretically each word is capable of recording eight different control operations before the next word in the control memory begins to be modified. In practice, this is not entirely true, since certain control operations are encoded over a plurality of bits, for example two or three bits. However, it will be understood that it would be very rare for a word of the control memory to be modified only a single time. Thus, as long as available bits remain in a word of the control memory, in other words bits that have not been modified compared with their original state, between the last bit modified and the end of the word in which this modified bit is located, then it is possible to re-use this word. However, as has also been explained in the introductory section of the present application, a word of the control memory can assume the same digital configuration as another word modified earlier in that memory, and this is why in a preferred embodiment, the second parameter (PA2) is constituted by the latest word modified in the control memory, and by the address in memory of this word.

Thus taking into account not only the value of the latest word modified in the control memory, that is, a word of which it is known that it has been modified with respect to the preceding session, but also the value of the address of this word, it is certain that the second parameter (PA2) cannot twice have the same value during the service life of the card.

This solution is economical in terms of memory, since it avoids having to provide a specific memory zone to constitute the second parameter (PA2), by benefiting from the existence of a portion of memory the data of which are capable of changing from one session to the next.

In a variant, which can be used in the case where the memory (MC) of the portable object (100) does not include a control memory, or in the case where the control memory is likely not to be modified in each session, a portion of the PROM-type zone (120) is then reserved to constitute the second parameter. More precisely, a certain number of words of this zone are reserved and modifiable, for example bit by bit. The modification of this zone in order to cause the evolution of the second parameter in the course of the sessions can be done in the following way: Each word of the portion of the PROM-type memory zone (120) allocated to the second parameter (PA2) is modifiable bit by bit, so that at a beginning of a session, after the reinitialization of the processing circuits of the portable object, one bit of one word is modified, and during the next session, the next bit of the same word is modified. When all the bits of the same word have been modified, then the next modification affects the first bit of the next word in this portion of the zone. In this way, each time there is a request for a random number during a session, the second parameter is constituted by at least the latest word modified in this portion of the zone and by the address in memory of this latest word modified. Thus the second parameter, when the word taken into account changes, is prevented from resuming a value that it had already had, since its address is taken into account as well.

This solution does consume somewhat more memory, since a portion of the zone is specifically reserved for the second parameter, but the additional consumption is entirely relative. In fact, assuming a portable object the memory of which would comprise 32-bit words, the service life of which would be voluntarily limited by the service provider to two years, and which would be used for two sessions per day, it would be necessary to reserve 46 words in the PROM-type memory zone (120), which corresponds to 184 eight-bit bytes of memory. This is relatively little, compared with the typical size of memory in portable objects of this type.

Generally, the control memory must be accessible for reading from the outside, and in the case where the second parameter is constituted by the latest word modified in the control memory, it cannot be secret. In that case, it is the third parameter which must be secret, and for this third parameter (PA3), a datum specific to the portable object in question will be chosen.

On the other hand, when the second parameter is constituted by the latest word modified in a specific portion of the PROM-type memory zone (120), it is possible to make it secret, and in that case, the third parameter (PA3) is not necessarily secret and may simply constitute the serial number, or any other datum specific to the portable object in question.

Figure 7A:
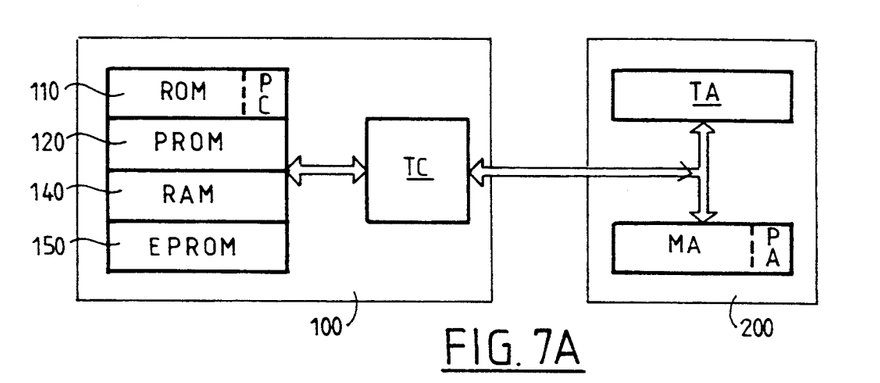

FIG. 7A illustrates another variant of the invention, in which the memory (MC) of the portable object (100) does not include a EEPROM-type memory zone. This variant differs from that of FIG. 6A in that in addition to the zones described in conjunction with FIGS. 6A and 6B, it includes an EPROM-type memory zone (150), that is, a zone that is nonvolatile but nevertheless is eraseable, for example by exposure to ultraviolet light. Unlike zones of the EEPROM type, it is not possible to select the portions of the zone that are capable of being erased, so that erasure affects all of the zones.

The variant illustrated in FIG. 7A makes it possible for the second and third parameters to be memorized and sampled in the PROM-type zone (120), as was the case in the variants illustrated by FIGS. 6A and 6B; the first parameter itself is always memorized in the RAM-type memory zone (140). Moreover, the second parameter may be constituted by the latest word modified in the control zone, when it is present, and by the address of this latest word modified, or by a latest word modified and its address in a specific portion of this PROM-type zone (120). The third parameter (PA3) may be constituted by the serial number of the portable object, or by any other datum specific to the portable object in question, whether or not it is secret, depending on whether the second parameter (PA2) is or is not secret.

Figure 7B:
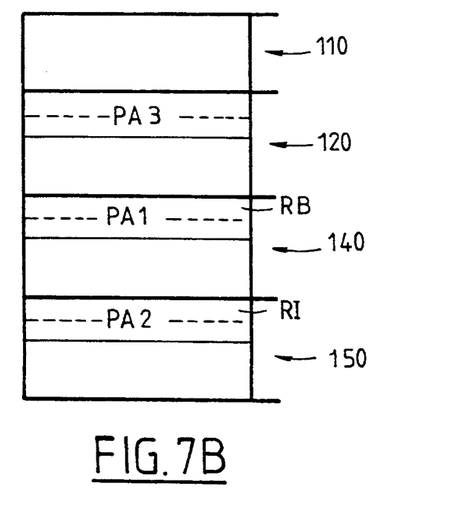

Contrarily, it is entirely possible that the presence of the EPROM-type zone (150) can be profitably employed to memorize the second and/or third parameter, by the same criteria as those defined in conjunction with FIGS. 6A and 6B. This is shown in FIG. 7B, in which the field (RI) containing the second parameter has been shown in the EPROM-type memory zone (150).

This field containing the second parameter (PA2) may be the control memory, or a specific field as described above in conjunction with FIGS. 6A, 6B and 7A.

The generation of a random number in a system that would not include a EEPROM-type memory zone would nevertheless be identical to that shown in FIG. 3 and described in the corresponding portion of this specification.

It is understood that the invention is not limited to the modes of embodiment described, but extends equally to any equivalents within the competence of one skilled in the art.

I claim:

1. A method for generating a random number in a data processing system including at least one portable object having electronic memory means, data processing circuits, and means for generating a random number as required during a data processing session, wherein said data processing session is defined as the time between the moment when the portable object is connected to a data processing apparatus and the moment when it is disconnected therefrom, said memory means having a volatile memory zone and a non-volatile memory zone, wherein said data processing apparatus includes processing circuits for processing data contained in said portable object, said method comprising the steps of executing a calculating program stored in said memory means of said portable object and taking into account parameters memorized in the memory means (MC) of the portable object for executing said calculating program, wherein the step of taking into account parameters includes the steps of:

providing a first parameter (PA1) to said calculating program, wherein said first parameter comprises a datum of a field (RB) of said volatile memory zone, and modifying said datum following each request for a random number during said data processing session, wherein the first parameter is provided such that said first parameter is incapable of having a same value twice during said data processing sessions; and providing a second parameter (PA2) to said calculating program, wherein said second parameter (PA2) comprises a datum of said non-volatile memory zone of the object, and modifying said datum at least once during said data processing session and preserving said datum between an end of one session and a next session, wherein said second parameter (PA2) is provided such that said second parameter (PA2) is incapable of having a same value twice during service life of the portable object.

2. The method of claim 1, wherein said non-volatile memory zone is divided into several digital words, and further including the step of modifying the contents of one of said words at least once during each data processing session by incrementing the value thereof, said second parameter comprising a latest word modified and the address of said latest word modified in said memory means.

3. The method of claim 2, wherein said non-volatile memory zone is a control zone dedicated to memorize different successive events taking place during service life of the portable object.

4. The method of claim 1, wherein said second parameter comprises two digital words (PA21, PA22) of a field (RI) of said non-volatile memory zone, said non-volatile memory zone being electronically erasable and reprogrammable (EEPROM), and further including the step of incrementing said second parameter during each session, said incrementing step including memorizing said two digital words in a buffer memory field (ZT) of the volatile memory zone; comparing said two digital words in said buffer memory field to determine which of aid two digital words has the highest value, incrementing the digital word in said buffer memory field having the highest value, and substituting said digital word in said buffer memory field having the highest value for the digital word in said non-volatile memory zone having the lowest value (PA21) or (PA22).

5. The method of claim 1, wherein the step of modifying the second parameter (PA2) takes place at the start of each session, after reinitialization of the circuits of the portable object (1,100), following connection of the portable object to the data processing apparatus.

6. A portable electronic object operable to calculate a random number, with memory (MC and processing circuits (TC), including at least one non-volatile memory zone (11,12) in which, among other data, data constituting a program for calculating the random number are memorized, at least one volatile memory zone (14), one field (RB) of which is reserved for memorizing a first parameter (PA1) that is modified one each request of a random number during one session, wherein one session is defined as the time between the moment when the portable object is connected to a data processing apparatus (2,200) and the moment when it is disconnected therefrom, wherein said first parameter is provided such that the latter is incapable of having a same value twice during said one session, and further including a non-volatile memory one (13, 120, 150) in which a field (RI) is reserved for memorizing a second parameter (PA2) that is modified at least once during each session and preserved between an end of one session and a next session, said second parameter (PA2) being provided such that said second parameter (PA2) is incapable of having a same value twice during service life of the portable object.

* * * * *

UNITED STATES PATENT AND TRADEMARK OFFICE
CERTIFICATE OF CORRECTION

PATENT NO.   : 5,365,466
DATED        : November 15, 1994
INVENTOR(S)  : HAZARD

It is certified that error appears in the above-indentified patent and that said Letters Patent is hereby corrected as shown below:

Col. 20, line 29 (Claim 4, line 11) "aid" should be --said--.

Col. 20, line 41 (Claim 6, line 2) "(MC and" should be --(MC) and--.

Col. 20, line 47 (Claim 6, line 8) "one each" should be --on each--.

Col. 20, line 55 (Claim 6, line 16) "one" should be --zone--.

Signed and Sealed this

Twentieth Day of June, 1995

Attest:

BRUCE LEHMAN

*Attesting Officer*     *Commissioner of Patents and Trademarks*